W. H. TAYLOR.
RECEPTACLE CLOSURE.
APPLICATION FILED OCT. 22, 1912.

1,199,128.

Patented Sept. 26, 1916.

WITNESSES.
N. R. Tyndall.
E. P. Hall.

INVENTOR.
W. H. Taylor.
By J. Edward Maybee.
ATTY.

UNITED STATES PATENT OFFICE.

WALTER HERBERT TAYLOR, OF PORT ARTHUR, ONTARIO, CANADA.

RECEPTACLE-CLOSURE.

1,199,128. Specification of Letters Patent. Patented Sept. 26, 1916.

Application filed October 22, 1912. Serial No. 727,120.

*To all whom it may concern:*

Be it known that I, WALTER HERBERT TAYLOR, of the city of Port Arthur, in the district of Thunder Bay, Province of Ontario, Canada, have invented certain new and useful Improvements in Receptacle-Closures, of which the following is a specification.

This invention relates to improvements in methods of sealing receptacles for food and the like with the aid of wax or other similar material which is liquid when hot and solid when cold, and my object is to so seal the receptacle as to insure the complete expulsion of all the air from under the seal, to render the seal effective with as small a quantity of wax as possible, to insure perfect contact of the molten wax with the mouth of the receptacle and to secure a compressive action on the solidifying wax as the contents of the receptacle cool.

I attain my object by placing in the container the material that is to be sealed, spreading a coating of a substance that will fuse under heat and solidify when cooled over said material so as to be sustained directly by the material to be sealed, displacing the wax laterally and up the sides of the mouth of the container by means of a plug floatable in the coating substance and the contents of the receptacle, and allowing the coating substance to cool and harden to engage and hold the plug.

The construction of the receptacle and plug is illustrated in the accompanying drawings in which—

Figure 3:
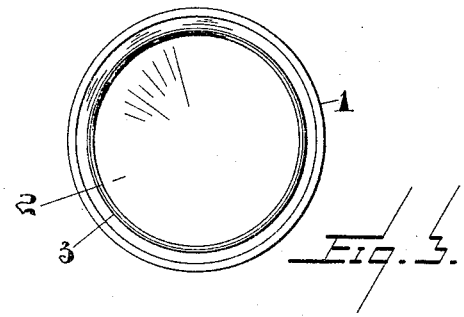
Figure 1:
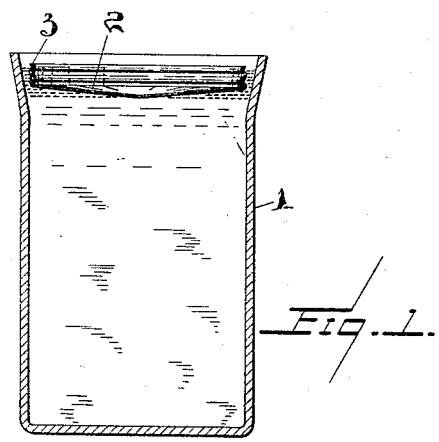
Figure 2:
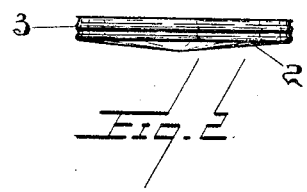

Figure 1 is a vertical section of the receptacle with the plug and sealing material in place; Fig. 2 a side elevation of the plug; and Fig. 3 a plan view of the receptacle with the plug in place.

In the drawings like numerals of reference indicate corresponding parts in the different figures.

1 is the receptacle formed of any suitable material, preferably glass or earthenware.

2 is the plug which, it will be seen, is of less diameter than the internal diameter of the mouth of the receptacle so that it is freely movable vertically therein. This plug is preferably, though not necessarily, formed of non-corrosible sheet metal. A disk form is preferred, the edge of the disk being provided with the upwardly turned flange 3. The plug will thus readily float either on the melted wax or on the contents of the receptacle. The center of the plug is depressed by being formed of a cone-shape. The protuberance thus formed increases the floatability of the plug and further displaces the melted wax on which it is floated toward the sides of the receptacle, thus effecting an economy in the amount of wax necessary to effect the sealing.

The mouth of the receptacle is preferably flared or otherwise increased in diameter from a point adjacent the top, for a purpose which will hereinafter appear. So also the wall of the plug may be corrugated or roughed to increase its contact with the wax.

The process of sealing is substantially as follows: The contents of the receptacle are poured into the same until the upper surface is somewhere near the top of the receptacle as shown. On top of the contents a suitable amount of melted paraffin wax or other sealing ingredient which is solid at ordinary temperatures, but is readily meltable, is poured, or the wax may be applied in solid condition and allowed to melt by the action of the heat of the contents. The plug 2 is then dropped into place. The protuberance on the plug displaces the wax from the center toward the circumference and causes it to flow up between the flange 2 and the inner surface of the mouth of the receptacle. The wax commences to consolidate from above downward since the wax in contact with the heated contents must necessarily longer retain the molten condition. As the wax consolidates it shrinks and the tendency is for it as it contracts to leave unfilled spaces, but this is prevented by the descent of the plug in the receptacle, the plug acting as a piston and carrying the wax down with it. Owing to the flaring of the mouth of the receptacle, the plug in its descent, as it carries the wax with it, forces the latter tightly against the sides of the mouth of the receptacle and a close seal is obtained. The wax having consolidated as described, the contents, by continued cooling and contraction, cause atmospheric pressure to continue to operate to depress the plug in the receptacle. This continued pressure has a strong tendency to mold the consolidated wax to the form of the contours of the receptacle and plug and thus to correct the slight shrinkage of the wax from the heated surface which usually accompanies its cooling and is the chief reason why paraffin has not been found to produce a perfect closure. This secondary molding of the paraffin after it is solidified but is still more or less plastic is made possible by the fact that the plug is supported solely by the contents of the receptacle with its supernatent layer of wax, being otherwise absolutely free to move within the mouth of the receptacle.

When it is desired to open the receptacle a needle is passed through the wax somewhere around the edge allowing the air into the interior, after which the plug is easily removed.

What I claim as my invention is:

1. The method of sealing materials in containers consisting in placing in a container the material that is to be sealed, spreading a coating of a substance that will fuse under heat and solidify when cooled over said material so as to be sustained directly by the material to be sealed, embedding a reinforcing plate in the coating substance while the latter is soft, and allowing the coating substance to cool and harden to engage and hold the reinforcing plate.

2. The method of sealing material in containers consisting in placing in a container the material that is to be sealed, spreading a coating of a substance that will fuse under heat and solidify when cooled over said material so as to be sustained directly by the material to be sealed, displacing the fusible substance laterally and up the sides of the mouth of the container by means of a plug floatable on the coating substance and the contents of the receptacle, and allowing the coating substance to cool and harden to engage and hold the reinforcing plate.

WALTER HERBERT TAYLOR.

Witnesses:
AMY SHERRATT,
K. A. TAYLOR.